United States Patent [19]

Carlino

[11] 3,803,563

[45] Apr. 9, 1974

[54] MAGNETIC CORE MEMORY

[75] Inventor: Frank Carlino, Fountain Valley, Calif.

[73] Assignee: Electronic Memories and Magnetics Corporation, Los Angeles, Calif.

[22] Filed: July 12, 1971

[21] Appl. No.: 161,604

[52] U.S. Cl......... 340/174 MA, 340/174 JA, 29/604

[51] Int. Cl............................................... G11c 5/04

[58] Field of Search 340/174 MA, 174 JA, 174 VA; 29/604

[56] References Cited

UNITED STATES PATENTS

| | | | |
|---|---|---|---|
| 3,174,837 | 3/1965 | Mears | 340/174 M |
| 2,934,748 | 4/1960 | Steimen | 340/174 M |
| 3,214,273 | 10/1965 | Frantzen, Jr. | 340/174 M |
| 3,263,221 | 7/1966 | Van Der Hoek | 340/174 PM |
| 3,696,345 | 10/1972 | Visschedijk | 340/174 MA |
| 3,139,610 | 6/1964 | Crown et al. | 340/174 MA |
| 3,421,865 | 1/1969 | Hanson et al. | 340/174 VA |
| 3,377,699 | 4/1968 | Dinella et al. | 340/174 MA |
| 3,594,897 | 7/1971 | Fulton | 340/174 MA |

FOREIGN PATENTS OR APPLICATIONS

| | | | |
|---|---|---|---|
| 45-40853 | 12/1970 | Japan | 340/174 JA |

OTHER PUBLICATIONS

IBM Technical Disclosure Bulletin, "Ferrite Core Matrix," by Pederson, Vol. 13, No. 3, Aug. 1970, p. 602.

Marquis, D. A. et al., Deep-Cavity Etched Laminated Matrix, IBM Technical Disclosure Bulletin, Vol, 12, No. 12, May 1970, pp. 2267–2268.

*Primary Examiner*—Stanley M. Urynowicz, Jr.
*Attorney, Agent, or Firm*—Lindenberg, Freilich & Wasserman

[57] ABSTRACT

A magnetic core memory stack is provided using a plurality of slotted plates for properly orienting arrays of magnetic cores. Each plate made of nonmagnetic material is significantly less in thickness than half the diameter of a toroidal core. Every slot is sufficiently wide and long to receive a core standing on end, but tapered in width and length sufficiently to prevent the core from passing through the slot. After cores have been positioned in a plane, they are threaded with the necessary drive and sense windings. Then the planes are cemented on a supporting printed-circuit board, or the like, through which connections are made to the core windings. The boards are then stacked to form the core memory.

3 Claims, 7 Drawing Figures

FRANK CARLINO
INVENTOR.

BY

Lindenberg, Freilich & Wasserman
ATTORNEYS

FRANK CARLINO
INVENTOR.

BY

Lindenberg, Freilich & Wasserman
ATTORNEYS

MAGNETIC CORE MEMORY

BACKGROUND OF THE INVENTION

This invention relates to magnetic core memory stacks, and more particularly to an improved structure for core planes of a stack.

A typical magnetic core memory is comprised of a stack of toroidal core planes. In each plane, the cores are arranged in rows and columns. Each core is oriented at 45° with respect to the rows and columns to facilitate threading the cores with conductors along the rows and columns and as well as long diagonal paths if desired. For example, in a typical coincident current core memory, each plane consists of a matrix of toroidal cores arranged in rows and columns. All cores in a given row are threaded by a common conductor to provide a single turn winding through each core. Similarly all cores in a given column are threaded by a common conductor. The two sets of conductors are referred to as the X and Y drive windings.

To store a binary 1 in a selected core of a given plane, the X and Y drive windings which cross at the selected core are each driven with a current pulse of half the amplitude necessary to set the core to the one state. All of the other cores wired by the energized X and Y drive windings are disturbed, but not set to the one state since each is subjected to a magnitomotive force of only half the value necessary to set it to the one state. To read a binary digit stored in a selected core, the X and Y drive windings which cross at the selected core are each driven with a current pulse of half the amplitude required to change the state of the selected core to that opposite the binary-1 state. A third winding (Z) passing through all of the cores of the plane diagonally senses a binary 1 being read from the selected core. A fourth winding (I) passing through all of the cores in the plane in a direction parallel to the X or the Y winding is used to selectively inhibit the storage of a binary 1 in a core of a selected plane.

Other patterns for threading cores with conductors have been employed for magnetic core memories of different types, such as the linear-select type, or what has come to be known as a 2 ½ D type. For each type, it is common practice to stand the cores of a plane on end, and to orient them at 45° to the rows and columns in a box or herringbone pattern to facilitate threading the cores along the rows and columns, and sometimes along a diagonal, as in the case of a typical four-wire, coincident-current core memory.

The practice has been to arrange the cores into the desired array pattern by placing a handful of cores (typically 10 to 20 mils in diameter) on a plate in a tray. The plate has slots in the desired pattern so that as the tray is vibrated, the cores fall into the slots. The slots are narrow, but almost as deep as the core diameter. For example, using a 20-mil core, the slots may be 18 mils deep so that when a core falls into a slot, it stands on end and protrudes sufficiently for a sheet of flexible material with an adhesive film to be used to remove the array of cores from the plate. Once a core has fallen into every slot in the tray, any excess cores are removed and the adhesive sheet is pressed against all of the cores. By carefully turning the plate upside down on a work table or board, and then carefully lifting the plate, the desired core array pattern is left adhesively affixed to the sheet with each core standing on end. The array is then transferred to a substrate coated with a suitable adhesive, such as RTV, a silicone rubber compound produced by the General Electric Company, or a lacquer. That is done by placing the adhesive sheet on the substrate with the cores pressed against the adhesive on the substrate. Then the adhesive plate is peeled off. Any cores which do not stay on the substrate must be replaced and aligned by hand, a difficult task. The desired windings through the cores are then provided. Core memory planes thus individually formed are placed on supporting printed-circuit boards, or the like, through which connections are made to the core windings. The completed memory plane boards are then stacked to provide a magnetic core memory of the desired size.

A magnetic plate is sometimes used instead of an adhesive sheet to lift the array of cores from the slots in the vibrating-tray plate. The array is then transferred to a substrate as before. An advantage of this technique is that cores are less apt to fail to adhere to the substrate, but a disadvantage is that if one core tilts too much, an unbalanced field is produced which will cause it to tilt further until it falls against an adjacent core. That further disturbs this field and quite often an entire row of cores will fall like a row of dominoes. For this reason, magnetic plates are not often used as a transfer vehicle.

SUMMARY OF THE INVENTION

An object of this invention is to provide a slotted plate which may be used on a standard vacuum vibrator for arranging cores in a desired array pattern, and thereafter used as a substrate for the array while threading cores with desired windings.

Another object of this invention is to provide an improved structure for a plane in a magnetic core memory using a slotted plate to support the cores, and to provide a method of fabricating such a plate.

Briefly, in accordance with one aspect of the present invention, a slotted plate is fabricated out of a sheet of plastic or other nonmagnetic material. The sheet is masked using photo resist techniques and then chemically etched to produce the desired pattern of slots. The slot pattern of the mask is virtually identical with a plan view of the desired core array. Only the size of the slots in width and length deviates from the thickness and outside diameter of the cores, and the deviation is preferably that of smaller dimensions. This chemical etching produces slots with walls which are invariably tapered to permit capture of toroidal cores on a vacuum vibrator, but not allow the cores to pass through the slots. Before using the etched plate on a vacuum vibrator, the resist is removed from the plate.

After cores have been vacuum vibrated into proper position in all slots, a gentle mist of an adhesive is sprayed over the cores to hold them in place without obstructing the apertures of the cores. Then a heavier layer of adhesive is applied between the cores and the plate from the side opposite the cores, again without obstructing the core apertures, preferably by cementing the core plate to a substrate which may be a printed circuit board or frame assembly plate, through which connections are made to windings threaded through the cores. The cores may be threaded either before or after the slotted plate is cemented to the substrate, but preferably afterwards. Then the adhesive sprayed over the cores may be removed with a solvent before threading. The slotted plate thus ultimately becomes an integral part of the core memory plane which can be stacked or otherwise combined with other planes to form a magnetic core memory.

The novel features that are considered characteristic of this invention are set forth with particularity in the appended claims. The invention will best be understood from the following description when read in connection with the accompanying drawings.

DESCRIPTION OF THE PREFERRED EMBODIMENT

Figure 1:
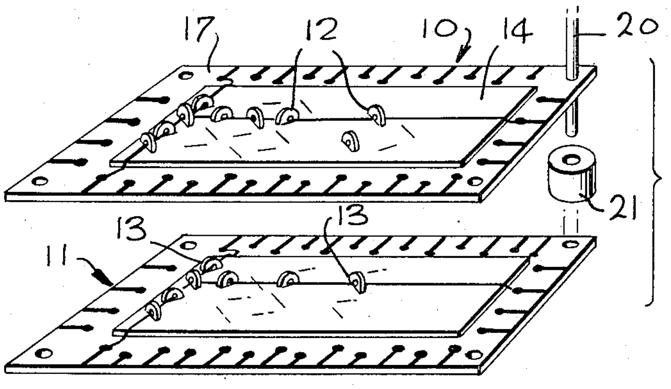
FIG. 1 illustrates in a perspective view the manner in which memory planes produced in accordance with the invention may be stacked in a magnetic core memory.

Referring now to the drawings, FIG. 1 illustrates the manner in which a plurality of core memory planes 10 and 11 are stacked to form a magnetic core memory after toroidal cores have been loaded in slots, such as cores 12 and 13.

Figure 2:
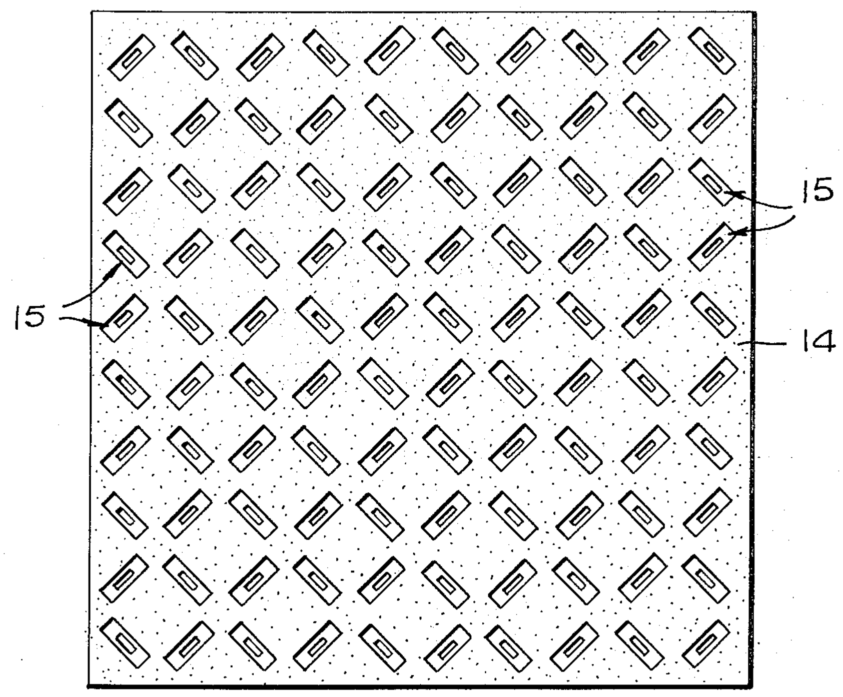
FIG. 2 is a diagrammatic plan view of a slotted plate employed to produce the core memory planes of FIG. 1.

FIG. 2 shows in a plan view a slotted plate 14 used in the plane 10. The plane 11, and other planes not shown, are identical to the plane 10. The plate is made of nonmagnetic material, either metallic, such as copper, aluminum, stainless steel, and the like, or nonmetallic, such as a polyester film (mylar), epoxy impregnated glass cloth, and the like, or laminations of metallic and non-metallic films. However, the slots are chemically etched; therefore, an acid or solution of acids which will dissolve both metallic and non-metallic films at substantially the same rate must be used to etch laminations. Consequently to simplify the etching process, a thin sheet of only one type of material is preferred.

Figure 3:
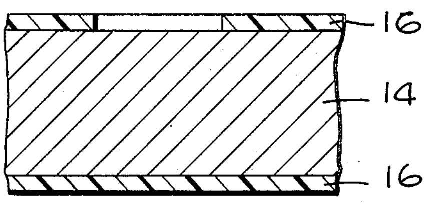
FIG. 3 is a sectional view of a portion of a plate masked for etching a given slot in the plate of FIG. 2.
Figure 4:
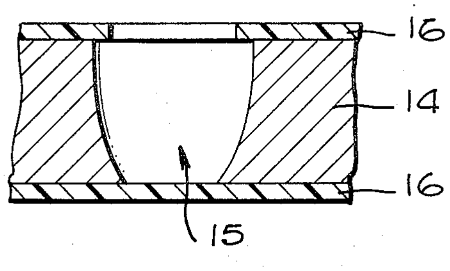
FIG. 4 is a sectional view of the masked-plate portion of FIG. 3 after etching.

The etching process will now be described with reference to FIGS. 3 and 4. A film 16 of photo-resist is deposited on both sides of the plate 14, such as by flow techniques. Such a resist is commonly a photo sensitive emulsion commercially available. Upon being exposed to suitable light, the photosensitive emulsion hardens to form an acid resist. Accordingly, to form a resist mask on the upper surface of the plate 14, the photo resist on that surface is exposed through a negative of the slot pattern shown in FIG. 2. At the same or separate time, the photo-resist on the other side of the plate is completely exposed to form a uniform film of acid resist. The exposed photo-resist is then developed in a suitable solvent to remove the unexposed emulsion where slots are to be etched. When the solvent has been rinsed off, the plate is masked as shown in FIG. 3 and ready to be etched.

The etchant is selected for the non-magnetic material selected for the plate 14. For example, if copper is selected, ferric chloride ($Fe\ Cl_3$) solution is used, and if epoxy impregnated glass cloth is selected, a solution of hydrofluoric and sulfuric acid is used. The hydrofluoric (HF) acid will dissolve the glass, and the sulfuric acid ($H_2SO_4$) will dissolve the epoxy. The etching time for the plate is dependent upon its thickness. The slot 15 is etched through the plate to the film 16 of photo-resist at the bottom. The etching process is allowed to continue until the surface of that film is exposed and the walls of the slot have spread out sufficiently to allow a core of predetermined thickness and diameter to enter the slot, but not pass through the slot.

It should be noted that as the etching process of the plate 14 proceeds, the underside of the photoresist mask is exposed due to the etching of the plate at a rather uniform rate in all directions. This underetching produces a slot having walls sloping inwardly from the top as shown in FIG. 4, a shape that is ideal for the present invention. It should also be noted that because of this underetching, the corresponding slots in the mask (upper film 16) are produced smaller than the opening desired in the etched slot 15. After the slots have been chemically etched in the plate 14, the films of photo resist are removed with a suitable solvent. The plate 14 is then ready to be filled with cores, one core standing on end in each slot, by placing the plate on a tray in a vibrating machine (not shown) having a vacuum source connected to draw air through the slots in the plate and the bottom of the tray. Thus vacuum holds the plate fast on the tray and captures cores which are vibrated into slots. This vacuum not only holds cores in the slots but greatly assists in causing the cores to align themselves in the slots in a substantially perpendicular position.

Before the plate 14 is removed from the vacuum vibrator, and while vacuum is still holding the cores in place, the cores are gently sprayed with a mist of adhesive, such as a lacquer, to temporarily bind the cores in place after the vacuum source is is turned off to remove the plate from the vibrator. The cores do not seal the slots so that the air being drawn through the plate by the vacuum source will cause most of the sprayed lacquer to adhere to the lower parts of the cores, and more particularly to the areas where the cores touch the walls of the slots. Very little, if any, lacquer will enter the apertures of the cores, but to assure maximum openings through the cores for threading conductors (windings), the lacquer may be removed from the cores after the loaded plate has been cemented onto a substrate which, as noted hereinbefore may be a printed circuit board or frame assembly board through which external connections to the windings are made.

Figure 5:
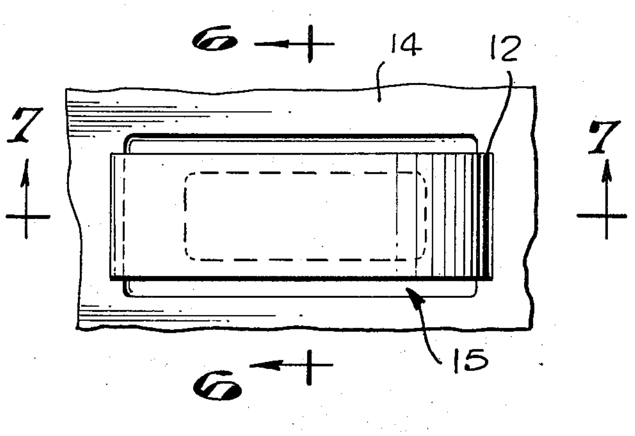
FIG. 5 is an enlarged plan view of a given core-filled slot in a plane of FIGS. 1 and 2.
Figure 6:
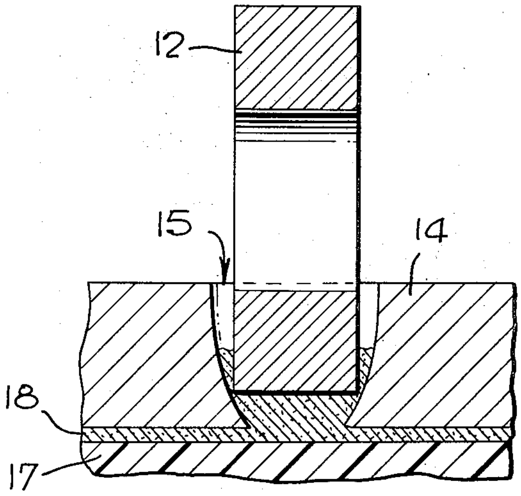
FIG. 6 is a sectional view taken along a plane 6—6 in FIG. 5.

FIG. 5 shows the slot 15 is an enlarged plan view. From sectional views taken along planes 6—6 and 7—7, it may be seen that the core 12 will not protrude through the opening of the slot. The bottom opening is desired so that the standard vacuum-vibration technique just described may be used to load cores into the slots, but it is desirable for the cores not to protrude through the bottom opening in order that the loaded plate may be cemented on a substrate, such as the substrate 17 in FIG. 1, without disturbing the cores, as more clearly shown in FIGS. 6 and 7 for the core 12. An adhesive 18 is first applied in a layer on the substrate 17 and then the loaded board is gently pressed down on the adhesive forcing some of the fluid adhesive up through the bottom opening into the slots and in contact with the cores, as shown for one core in FIGS. 6 and 7. When the adhesive has cured or solidified, the cores are secure in the upright position, and the lacquer sprayed over the top of the cores may be removed prior to threading the windings, as noted hereinbefore.

The windings are threaded through the cores in the usual manner. The difference is that now the slotted plate used to arrange the cores in the desired array has been used as the carrier to transfer the array onto the substrate, the substrate here being the printed circuit board or frame assembly board, and has become an integral part of the core plane. Before the core array was transferred to a substrate using an adhesive sheet or magnetic plate. Often the substrate was not a part of the printed circuit board or frame assembly, but was later cemented in place in much the same manner as the slotted plate is cemented according to the present invention usually after threading the windings.

Figure 7:
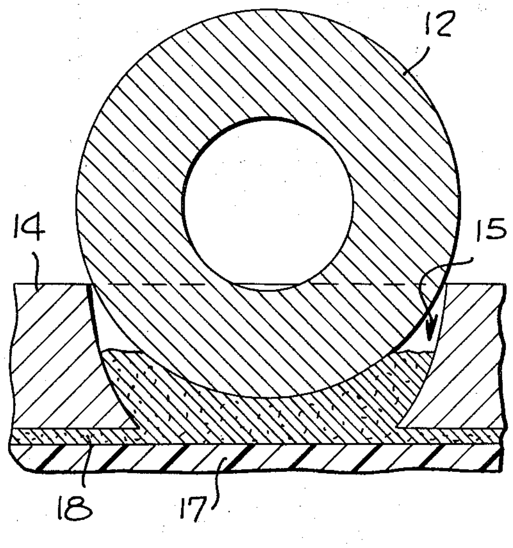
FIG. 7 is a sectional view taken along a plane 7—7 in FIG. 6.

The thickness of the plate 14 is so selected that, when etched and loaded with cores, all or a substantial part of the aperture of each core will be above the upper surface of the plate, as shown in FIG. 7 for the core 12. This provides a maximum opening for a threading needle to be passed through a line (row, column or diagonal) of cores. In the past, the process of transferring a core array onto a substrate has allowed the core to shift out of alignment. Since the effective size of opening for the threading needle is only that much which can be "seen" through the line of cores, it is evident that any shifting of the cores out of line will decrease the opening. Since the slotted plate of the present invention maintains the alignment until the cores are threaded, a larger effective opening is achieved for the threading process. This in turn allows a smaller core to be used for the same number of single-turn windings per core, and therefore allows faster memory cycles to be achieved than would otherwise be possible.

The box pattern shown for the slotted plate 14 in FIGS. 1 and 2 is commonly used for a standard coincident current core memory having not only X and Y drive windings, and inhibit windings parallel to the X or Y winding, but also a diagonal Z sense winding. This pattern has been shown by way of example only, and not limitation, for obviously other patterns such as the single or double herringbone patterns may be used for other types of core memories which do not employ diagonal windings. Once the windings have been threaded, the ends of the windings are connected to terminals of the printed circuit board or frame assembly on which the slotted plate has been cemented. Thus, for the purpose of illustrating the present invention, the substrate 17 may be considered to be either a printed circuit board or a frame assembly, both of which are referred to hereinafter in the claims by the generic term "substrate" meaning a surface on which a slotted plate loaded with cores is secured to provide a convenient place to connect the core windings to other corresponding core windings or external circuits.

In stacking core memory planes produced according to the present invention rods and spacers, such as a rod 20 and an annular spacer 21 shown in FIG. 1, may be employed to secure the stack and assure proper spacing between substrates. However, other arrangements and techniques for stacking the planes produced according to the invention may be employed.

While a particular embodiment of the invention has been described, many modifications and variations therein may be resorted to, particularly in the geometry of the core arrays and windings, without departing from the teachings of the invention. Accordingly, it is not intended that the scope of the invention be determined by the disclosed exemplary embodiments, but rather should be determined by the breadth of the claims.

I claim:

1. A magnetic core memory stack comprised of a plurality of plates made of nonmagnetic material, each plate being slotted to receive toroidal magnetic cores on one side thereof, each slot being so formed as to hold a single core standing on end in proper orientation relative to all other cores supported on said plate, and substantially all of the hole of each core of an array being above the surface of said plate on said one side, and a plurality of windings passing through said holes of said cores on said plate in a desired pattern to form a core memory plane, each plate being secured to a substrate through which connections to said windings can be made as an integral part thereof using a film of adhesive applied to said substrate in a fluid state of sufficient thickness to allow adhesive to rise in each slot while still in a fluid state, thereby providing adhesive to each of said slots to a level sufficient to cement the cores in their respective slots.

2. A method of producing a core memory plane employing a plate holding a plurality of toroidal cores of uniform size in a desired pattern for a core memory plane, each core standing on end with substantially all of the hole of each core above the surface of said plate, comprised of masking said plate on one side thereof with a chemical resist for etching slots in said pattern through to the other side thereof, completely, masking said plate on said other side, terminating the process of chemical etching said plate when each of said slots has been etched to expose chemical resist on said other side over an area smaller than the desired slot opening on said one side, and smaller in length and width than the diameter and thickness of said cores, thereby producing each slot with walls which are tapered from said desired opening in said one side to said smaller opening in said other side, removing from said plate said chemical resist from said one side and said other side, vacuum vibrating cores into said slots, and cementing said plate on a substrate using an adhesive in a fluid state to allow adhesive to rise in said slots to a level sufficient to cement said cores in said slots.

3. A method as defined in claim 2 wherein the vibration in said vacuum vibration step of loading cores into said slots is terminated, and while vacuum is being applied, spraying a light mist of adhesive over the top of said cores to hold said cores in said slots while said plate loaded with cores is being cemented onto said substrate.

* * * * *